Figure 1:
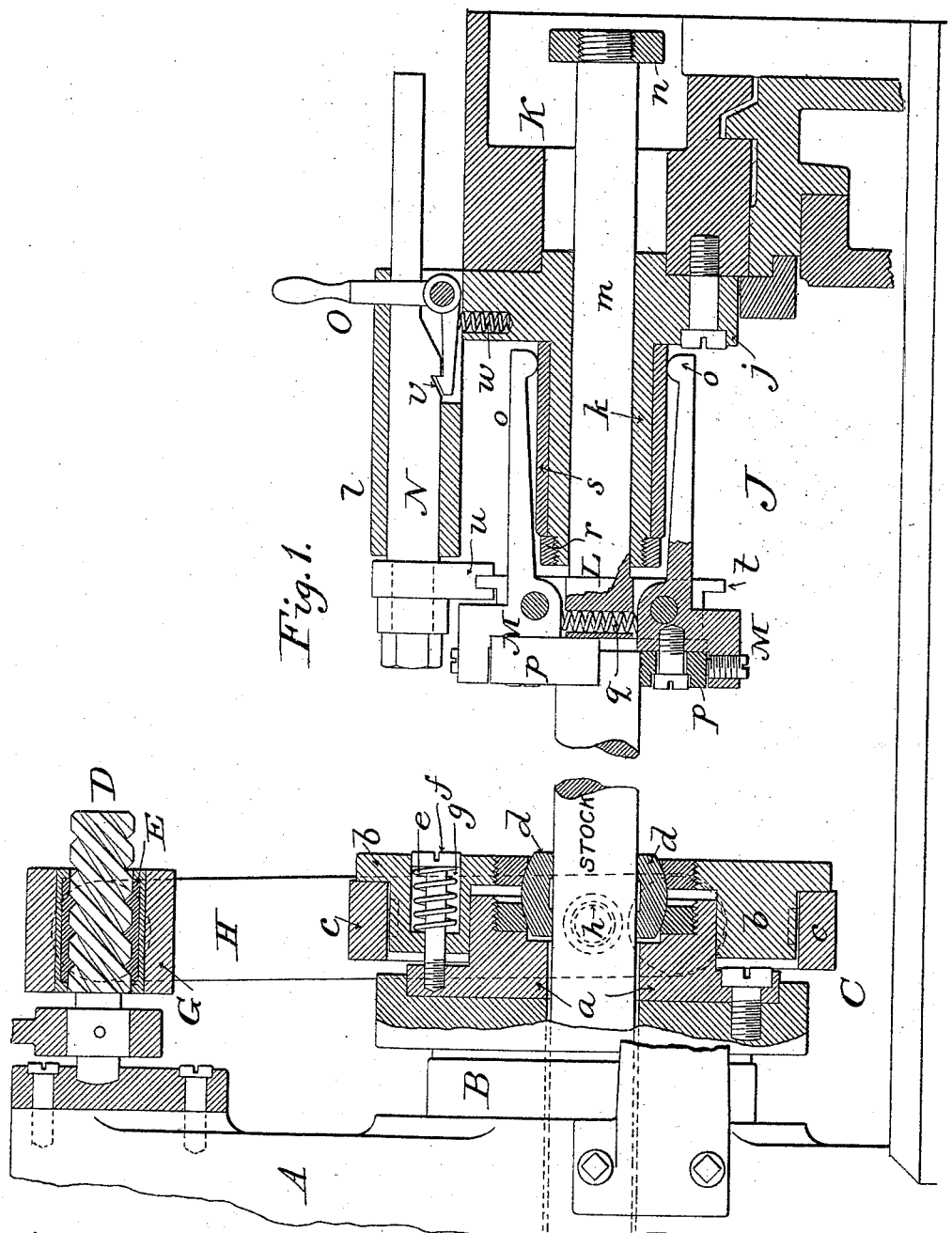

(No Model.)

C. M. CONRADSON.
ROD FEEDING DEVICE.

No. 489,935.

2 Sheets—Sheet 1.

Patented Jan. 17, 1893.

Attest:
James F. Duhamel.
Horace A. Dodge.

Conrad M. Conradson
Inventor:
by Dodge & Sons,
his Attorneys.

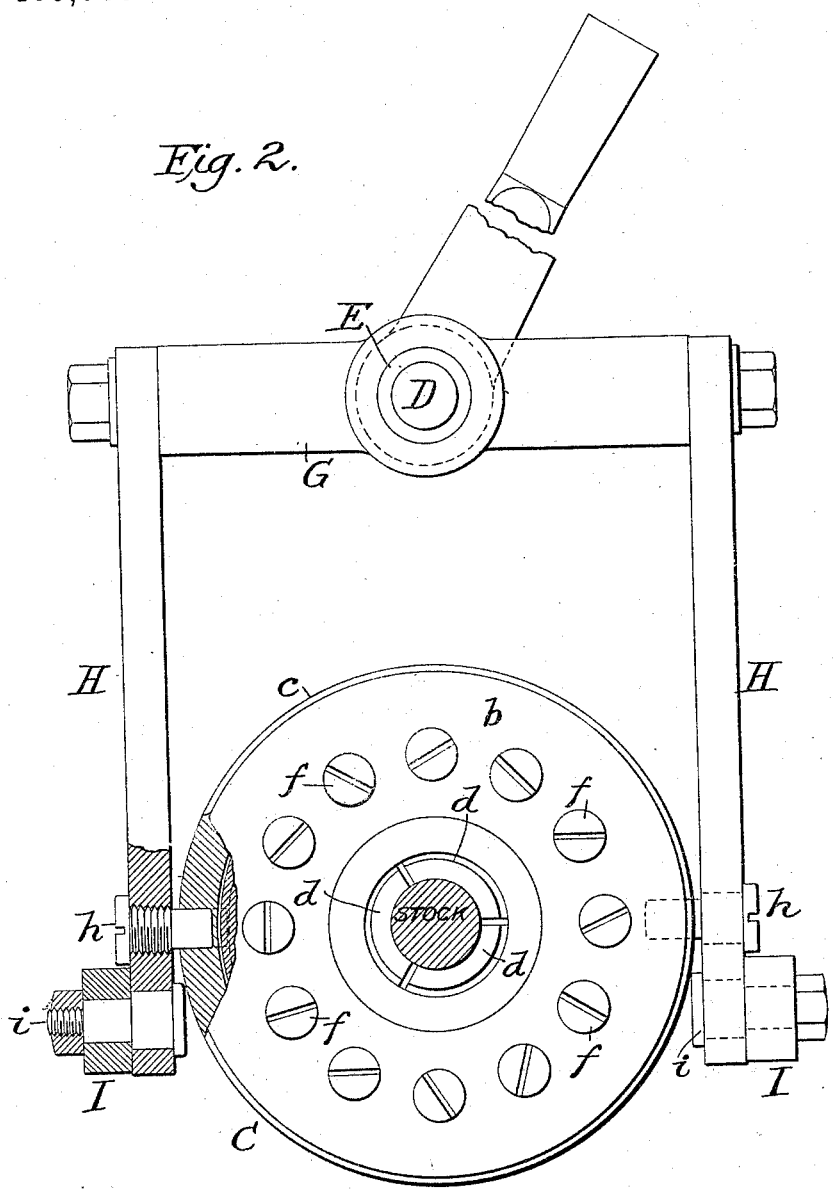

UNITED STATES PATENT OFFICE.

CONRAD M. CONRADSON, OF MADISON, WISCONSIN.

ROD-FEEDING DEVICE.

SPECIFICATION forming part of Letters Patent No. 489,935, dated January 17, 1893.

Application filed June 29, 1892. Serial No. 438,434. (No model.)

*To all whom it may concern:*

Be it known that I, CONRAD M. CONRADSON, a citizen of the United States, residing at Madison, in the county of Dane and State of Wisconsin, have invented certain new and useful Improvements in Rod-Feeding Devices, of which the following is a specification.

My invention relates to rod feeding devices designed more particularly for screw machinery, but equally applicable to other classes and styles of machines.

In the drawings: Figure 1 is a vertical longitudinal sectional view of my improved device, and Fig. 2 a front face view, partly in section, of the chuck and its actuating mechanism.

A indicates the head-stock, B the hollow arbor through which the rod or stock is drawn, and C the chuck as a whole. This chuck comprises a body portion, $a$, an annular sliding plate, $b$, grooved or reduced to receive the band or ring, $c$, and jaws, $d$, designed to be actuated by the ring. The jaws are sections of a split ring and are seated in a recess formed in the body, $a$, in line with the hollow arbor; the outer faces of the jaws being either conical or spherical, as preferred. Springs, $e$, surrounding the bolts, $f$, and seated in sockets, $g$, in the plate, $b$, tend to urge the plate inward toward the body of the chuck, and, by acting upon the inclined outer faces of the jaws, force the latter inward toward each other upon the interposed rod or stock. When the plate, $b$, moves outward away from the chuck body, pressure upon the jaws is removed, thereby allowing them to release their hold upon the stock. In order to actuate the plate, $b$, I employ the hand screw, D, one end of which is seated in the head-stock, while the other end engages a nut, E, carried by a cross-bar, G. This cross-bar, G, is provided with or secured to two arms, H, which pass down on opposite sides of the chuck where they are connected by pivot screws, $h$, with ring or band, $c$; said arms being pivoted at their lower ends upon bolts, $i$, carried at the forward ends of the arms or brackets, I. Now, by turning the screw, D, in one direction, the arms, H H, will be carried forward, and, acting through the band, $c$, will carry the plate, $b$, outward so as to release the jaws, as above described. As soon, however, as the hand is removed from the handle of screw, D, the coiled springs, $e$, will return the parts to their normal positions, the quick pitch of the screw, D, permitting such action. By making the jaws with a spherical exterior, they will readily adjust or adapt themselves to any inequalities in the rod or stock.

J indicates the gripper as a whole, which is shown mounted upon the turret, K, but which may obviously be mounted upon any other suitable moving part. The gripping mechanism or gripper comprises a plate or body portion, $j$, having a tubular stem or projection, $k$, in line with the hollow arbor, B. At its upper end this body portion is provided with a forwardly extending housing or tubular shell, $l$, for a purpose presently explained. Mounted within the tubular stem, $k$, so as to rotate or to move lengthwise therein, is a block, L, having a stem, $m$, carrying at its inner end a nut or stop, $n$, to limit the outward movement; the outer end or head of the block being stotted radially to receive the pivoted jaws, M, having the tails, $o$, and the adjustable shoes, $p$. These jaws are held normally apart by means of a spring, $q$, seated in a hole or opening extending through the head of the block. The tails, $o$, of the jaws are rounded and are designed to bear upon either of the collars, $r$ and $s$, upon the stem, $k$.

The head of block, L, is provided with an annular ledge, $t$, which is embraced by the forked arm, $u$, of a sliding bar, N, which latter is mounted in the housing, $l$. Bar, N, is provided with a notch, $v$, into which fits the hooked end of an elbow lever, O, pivoted in the housing, $l$, as shown, and held in engagement with the bar by a spring, $w$.

When the parts are in the position shown in Fig. 1, the block, L, and attendant parts may turn or rotate about its axis or stem, $m$; but it cannot move outward away from the turret as it is held against such movement by the bar, N, and locking lever, O. Now by tipping the lever and disengaging it from the bar, the block, L, with its levers may be moved outward away from the turret a limited distance. When the block, L, is thus moved outward, the tails, $o$, of the levers or jaws, M, will come opposite the reduced or smaller collar, $r$, thus allowing them to be rocked or opened by the spring, $q$; but when the block moves inward, the tails, $o$, of the jaws will be spread apart by the collar, $s$, and the operative ends of the jaws closed upon the stock or rod against the action of the spring, $q$.

When it is desired to feed the rod or stock through the hollow arbor, the chuck jaws are opened, and the block, L, of the gripper moved outward from the turret so that the jaws, M, may open to receive the projecting end of the stock, which projects slightly beyond the face of the chuck. The gripper is now moved bodily toward the chuck, but as the end of the rod is bearing against the front end of the block, L, the latter will be prevented from moving, but will slide into the tubular stem, $m$. This action causes the jaws, M, to bite or clamp the rod or stock, and also causes the lever, O, to lock the bar, N (and also the block, L, and attendant parts), against further longitudinal movement relatively to the turret. When the jaws or levers are thus locked upon the rod or stock and the block locked to the turret, the latter, carrying the gripping mechanism, is moved away from the chuck and draws the rod or stock through the latter and through the hollow arbor to which the chuck is secured.

The rod or stock may be held by the jaws, M, during the cutting of the rod so as to rotate therewith, or the rod may be released and the gripping devices turned around out of the way (upon the axis of the turret) so as to present other tools to the rod or stock. Instead of employing the band or ring, $c$, the plate, $b$, may be provided with an annular groove, shown in dotted lines, to receive the ends of the pivot screws, $h$. So, too, other forms of levers or mechanism for moving the band or the plate may be substituted for the devices shown.

What I claim is:

1. In combination with the chuck body, its jaws and sliding plate, the band or ring, the pivoted arms connected with the plate, and the screw for rocking the arms.

2. In combination with the chuck body, its jaws and sliding plate, the band or ring, the pivoted arms connected with the plate, the cross-bar having a nut, and a screw engaging the nut.

3. In combination with the chuck body, its jaws and sliding plate, the actuating band, a quick pitch screw and intermediate connections for moving the band in one direction, and springs for moving the band in the other direction.

4. In combination with the head-stock having the arms or brackets, the levers journaled therein, and carrying a nut, a screw engaging the nut and head-stock, a chuck body provided with jaws and a sliding plate, and an actuating ring pivoted to the levers.

5. In combination with a turret, a plate, $j$, provided with a tubular hub or stem, $k$, gripping devices mounted in the tubular stem so as to slide longitudinally or turn therein; the sliding bar, N, and the pivoted locking lever, O.

6. In combination with a turret, gripping devices comprising two parts, one adapted to move lengthwise and to turn relatively to the other, and the sliding forked locking bar mounted in one of said parts and engaging the other.

7. In combination with the plate, $j$, having the hollow stem, $k$, the block, L, provided with a stem, $m$, and nut, $n$, and gripping levers carried by the block.

8. In combination with plate, $j$, having housing, $l$, the notched bar, N, mounted in the housing, and forked at its forward end, the pivoted lever, O, and the block, L, provided with gripping jaws, and with an annular ledge, $t$, which is embraced by the forked rod.

In witness whereof I hereunto set my hand in the presence of two witnesses.

CONRAD M. CONRADSON.

Witnesses:
W. R. BAGLEY,
J. RUDD.